Sept. 25, 1923.
C. S. PRESTON
1,469,020
RESILIENT CHANNEL AND CUSHION TIRE
Filed March 12, 1923
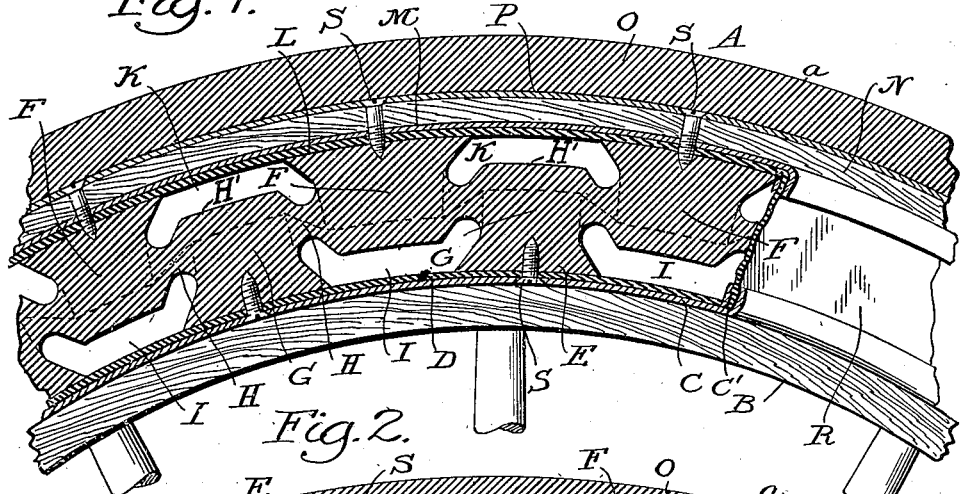
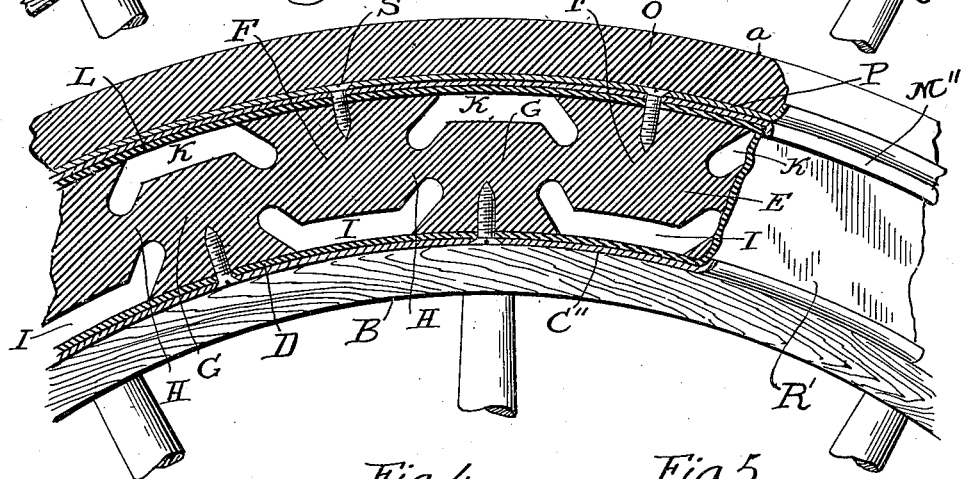
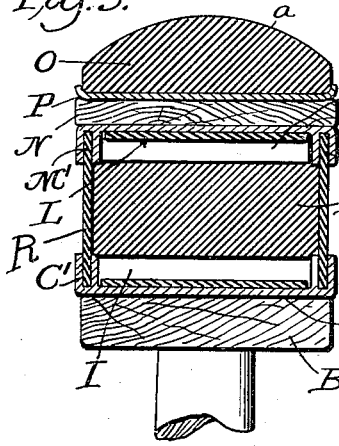
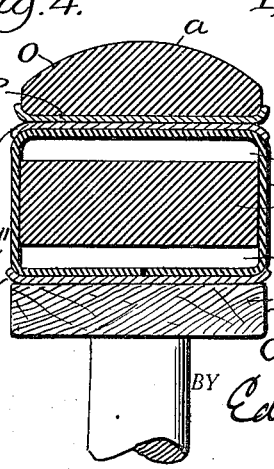
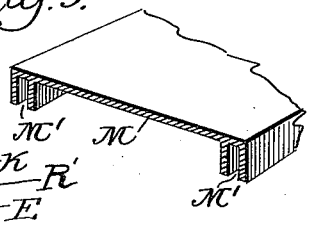
INVENTOR.
Clarence S. Preston,
BY Edson Bros.
ATTORNEY.S Patented Sept. 25, 1923.

1,469,020

UNITED STATES PATENT OFFICE.

CLARENCE S. PRESTON, OF SAN DIEGO, CALIFORNIA.

RESILIENT CHANNEL AND CUSHION TIRE.

Application filed March 12, 1923. Serial No. 624,435.

*To all whom it may concern:*

Be it known that I, CLARENCE S. PRESTON, citizen of the United States, residing at San Diego, in the county of San Diego and State of California, have invented certain new and useful Improvements in Resilient Channel and Cushion Tires, of which the following is a specification.

This invention relates to vehicle tires of the solid type provided with channels or voids and cushions, adapted in particular for vehicles which carry heavy loads such as trucks, and also slow moving pleasure vehicles particularly of the electric driven type.

The principal object of my invention is to provide in a tire of the solid type (as distinguished from a pneumatic tire) an annular core or central portion of resilient material having an outer and inner series of straight voids, approaching a crescent shape in cross section, extending transversely through the tire, in such a manner that those voids placed nearer to the outer periphery of the core will be spaced between the voids placed nearer to the inner periphery of the core; also so arranged that the two series of voids will overlap each other so that there will always be an air space on any radial line drawn from the wheel center to the outer periphery of the tire into which solid matter of the core will be forced, when under pressure, thereby increasing the resiliency of the tire as well as preventing road or load shock from being transmitted directly to the vehicle body.

Another object is to inclose this core on its inner and outer periphery, with flat rubber rings, flat metal rings and wooden felloes, for the purpose of increasing the strength and durability of the tire, a metal rim, to which is fitted a solid rubber tread forming the outer periphery of the completed tire, being mounted on the outer periphery of the outer wooden felloe in a well known manner, all in order to withstand load and road shock and add to the resiliency of the tire.

Another object is to provide for the exclusion of dust and dirt or mud from the voids by placing an annular flat rubber flange on each side of the tire to be held in place by grooves in the outer and inner metal rings which inclose the outer and inner periphery of the core.

Another object is to increase the resiliency of tires of the solid type by providing for interior displacement of the solid portions which will bear on elastic webs forcing the same into the voids, all in such a manner as to reduce road and load shock and increase the resiliency of a solid tire.

Another object is to form ribs between the inner voids and adjacent to the inner periphery which when under load pressure, will be forced intermittently into the outer series of voids, and also to form posts between the outer voids, which, when under load pressure, will be forced intermittently into the inner series of voids, thereby increasing the resiliency of the tire and reducing the shock due to load pressure and road shock so that same will not be transmitted to the vehicle body.

The matter constituting my invention will be defined in the claims.

I will now describe my invention in detail by reference to the accompanying drawings, in which:

Figure 1 represents a transverse section of a tire embodied in my invention with parts shown in elevation.

Fig. 2 represents a transverse section of a modified type of the same tire.

Fig. 3 represents a cross section of Fig. 1.

Fig. 4 represents a cross section of Fig. 2.

Fig. 5 represents a fragmentary perspective sectional view of the metal band M.

The tire A, which is the tire proper including all materials from the outer periphery of the tread portion $a$ to the inner periphery of the metal rim C, fits on the wooden felloe B of a wheel X (wheel X not shown) and is fastened thereto by well known means.

The principal portion of the tire is the inner portion or core E of resilient material such as rubber or rubber compound which is provided with straight transverse voids I and K to allow for interior displacement of the ribs G and posts F, the said ribs G and F being supported by the elastic webs H and H'. The voids I and K are preferably formed in moulding the core E, Fig. 1, and are a near crescent shape in cross section. The concave sides of the voids I face the outer periphery of the tire while the concave sides of the voids K face the inner periphery of the tire. The two series of voids are placed in staggered position to each other, but at the same time they overlap each other so that whatever position the wheel rests on the tread there is always an air chamber or void on any radial line which might be drawn from the center of the wheel to the outer periphery of the tire, which provides at all times for interior displacement of the solid material when under load pressure.

The ribs G are formed between the inner series of voids I and their bases are adjacent to the inner periphery of the core E. The posts F are formed between the outer series of voids K and their bases are adjacent to the outer periphery of the core E.

Covering the outer periphery of the core E and preferably vulcanized to the bases of the posts F is a flat annular piece of rubber or rubber compound L to prevent circumferential movement of the posts F when under stress or strain as shown in Fig. 1. Likewise covering the inner periphery of the core E and preferably vulcanized to the base of the ribs G is another flat annular piece of rubber or rubber compound D to prevent circumferential movement of the ribs G, Fig. 1. It is not intended that there should be any circumferential movement of either of the posts F or the ribs G when under load pressure. The resiliency of the tire is obtained by the interior displacement of the posts F and G and elastic webs H and H' into the voids I and K, Fig. 1. The core E is next inclosed on its inner and outer periphery by thin metal bands, the metal band C being adjacent to the inner periphery and the metal band M being adjacent to and surrounding the outer periphery of the core E. The core E is preferably vulcanized to the metal bands C and M, to make a compact strong and durable inner portion for the tire with corresponding resiliency. The metal bands C and M are provided respectively with grooves C' and M', in which are fixed flat, thin, annular rubber sheets R which lie flat against the sides of the core E for the purpose of covering and excluding from the voids I and K, dust, dirt, mud and water, which would, if not excluded, clog up the voids and lessen the resiliency of the tire.

A wooden felloe N is preferably mounted on the metal band M, and the metal rim K, having turned up edges P, to which is preferably vulcanized an outer portion of the tire—the thread portion—of rubber or rubber compound, is mounted on the said wooden felloe N.

Screws S are preferably passed through the rim P, wooden felloe N, metal band M, rubber band L and partially into the bases of the posts F, and also are preferably passed through the metal band C, rubber band D and partially into the base of the ribs G, to make the tire compact and prevent circumferential movement of the various parts to which reference is made and as shown in Figs. 1 and 2 of the drawings.

The tire, as shown in Fig. 2, modified drawing, differs from the tire shown in Fig. 1, in that the wooden felloe N is omitted and the metal rim P is mounted on the metal band M''. The metal bands M'' and C'' are not provided with slots or grooves as the rubber sheets R are omitted and in their place I provide an annular rubber casing R' which entirely surrounds the core E. The casing R' is preferably vulcanized to the outer and inner periphery of the core E but not to the sides as it would interfere with the resiliency of same.

I claim:

1. In a solid tire, an annular core having an outer and inner series of voids approaching a crescent shape in cross section, placed in staggered position to and overlapping one another and running transversely through said core, an inner series of ribs lying between the inner series of voids adapted to bear on elastic webs suspended between an outer series of posts, formed between the outer series of voids, and force said webs into the outer series of voids in order to increase the resiliency of a solid tire when under pressure and prevent road shock from being transmitted to a vehicle body.

2. In a tire of the solid type, the combination with a core of resilient material, having an inner and outer series of voids placed in staggered position to and overlapping one another, an inner series of ribs, and an outer series of posts, of a thin flat rubber band vulcanized to the outer periphery of said core and a thin flat rubber band vulcanized to the inner periphery of said core, to prevent circumferential movement of said posts and ribs lying between the outer and inner series of voids.

3. In a tire of the solid type, the combination with a core, of resilient material, having an inner and outer series of voids placed in staggered position to one another, and inner series of ribs, and outer series of posts, and flat rubber bands vulcanized to the inner and outer peripheries of said core, of metal bands having grooves, inclosing the outer and inner flat peripheries of said core, to give rigidity and strength to the core and tire.

4. In a tire of the solid type, the combination with a core of resilient material, having transversely disposed voids, ribs, posts and elastic webs, and inclosed on its outer and inner peripheries by metal bands, having grooves, of thin, flat, annular rubber sheets, adapted to be held in place by said grooves or slots in the said bands against the sides of said core, to prevent dirt, stones and water from entering and being lodged in the said transverse voids which would tend to lessen the resiliency of said core and tire.

5. In a tire of the solid type, the combination with an annular core of resilient material, provided with an inner and outer series of voids, an inner series of ribs, an outer series of posts, and elastic webs suspended between said posts and ribs, an inner rubber band and inner metal band, an outer rubber band and outer metal band, of an outer wooden felloe and metal rim, to which is fixed an outer tread portion of rubber or rubber compound, and screws passing through said inner bands into the bases of said inner ribs and through said outer rim and bands into the bases of said outer posts, to form all the various parts in one solid mass and prevent circumferential and lateral movement of same, and make a compact, resilient tire which will prevent shock from load pressure or road shock from being transmitted to a vehicle body.

6. In a tire of the solid type an interior core of resilient material, provided with an inner and outer series of voids placed in staggered position to one another, said core being surrounded by an annular piece of rubber, to exclude dust, dirt and water from the voids, which is vulcanized to the inner and outer periphery of the core but left free on each side so that it will not interfere with the resiliency of the core in combination with its other parts.

In testimony whereof I affix my signature.

CLARENCE S. PRESTON.